(12) United States Patent
Soryal

(10) Patent No.: US 12,373,525 B2
(45) Date of Patent: Jul. 29, 2025

(54) USER AUTHENTICATION USING A MOBILE DEVICE

(71) Applicant: AT&T Intellectual Property I, L.P., Atlanta, GA (US)

(72) Inventor: Joseph Soryal, Glendale, NY (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 433 days.

(21) Appl. No.: 17/516,061

(22) Filed: Nov. 1, 2021

(65) Prior Publication Data

US 2023/0138176 A1   May 4, 2023

(51) Int. Cl.
  *G06F 21/31*   (2013.01)
  *G06F 21/36*   (2013.01)
  *G06N 20/00*   (2019.01)

(52) U.S. Cl.
  CPC .......... *G06F 21/316* (2013.01); *G06F 21/36* (2013.01); *G06N 20/00* (2019.01)

(58) Field of Classification Search
  CPC ........ G06F 21/316; G06F 21/36; G06N 20/00
  See application file for complete search history.

(56) References Cited

U.S. PATENT DOCUMENTS

| | | | | |
|---|---|---|---|---|
| 8,613,064 B1* | 12/2013 | Roy | ...................... | G06F 21/316 726/7 |
| 8,620,666 B1* | 12/2013 | Whitmore | ............... | G10L 17/00 704/246 |
| 8,898,760 B2* | 11/2014 | Wheeler | ............... | H04L 9/3228 713/168 |
| 9,141,150 B1* | 9/2015 | Trundle | .................. | G06F 3/017 |
| 9,231,962 B1* | 1/2016 | Yen | ..................... | H04L 63/1425 |
| 9,969,356 B2* | 5/2018 | Siswick | ............. | G07C 9/00309 |
| 10,445,733 B1* | 10/2019 | Wurmfeld | ............. | G06F 21/316 |
| 10,867,612 B1* | 12/2020 | Pollack | ................... | G10L 17/10 |
| 10,885,461 B2* | 1/2021 | Garvey | ................. | G06F 16/285 |

(Continued)

FOREIGN PATENT DOCUMENTS

| | | | | |
|---|---|---|---|---|
| KR | 20140094990 A | * | 7/2014 | ............... H04L 9/32 |
| WO | WO-2018087764 A1 | * | 5/2018 | ............. G06F 21/32 |

(Continued)

*Primary Examiner* — Sarah Su
(74) *Attorney, Agent, or Firm* — Guntin & Gust, PLC; Miyoung Shin

(57) ABSTRACT

Machine-learning based user authentication using a mobile device (e.g., using a computerized tool) is enabled. For example, a non-transitory machine-readable medium can comprise executable instructions that, when executed by a processor, facilitate performance of operations, comprising: determining an input received via a mobile device, determining, based on the input and using an authentication model, whether the input threshold matches an input pattern associated with an authorized user profile authorized to access a feature of the mobile device, wherein the input pattern has been determined based on machine learning applied to past inputs at the mobile device other than the input, and wherein the authentication model has been generated based on the machine learning applied to the input pattern, and based on a determination that the input at the mobile device is associated with an authorized user profile, granting access to the feature of the mobile device.

20 Claims, 13 Drawing Sheets

(56) References Cited

U.S. PATENT DOCUMENTS

| | | | | |
|---|---|---|---|---|
| 11,475,778 B1* | 10/2022 | Kaneria | | G08G 5/0008 |
| 11,715,563 B1* | 8/2023 | Fox | | G16H 50/30 |
| | | | | 705/2 |
| 2011/0316665 A1* | 12/2011 | Mehew | | G06Q 20/40145 |
| | | | | 340/5.52 |
| 2013/0227651 A1* | 8/2013 | Schultz | | G06F 21/32 |
| | | | | 726/4 |
| 2013/0269013 A1* | 10/2013 | Parry | | H04L 63/10 |
| | | | | 726/7 |
| 2014/0189808 A1* | 7/2014 | Mahaffey | | G06F 21/6245 |
| | | | | 726/4 |
| 2015/0189502 A1* | 7/2015 | Meredith | | H04W 4/029 |
| | | | | 455/456.3 |
| 2017/0227995 A1* | 8/2017 | Lee | | G06N 20/00 |
| 2017/0300284 A1* | 10/2017 | Okabayashi | | G06F 3/1454 |
| 2019/0065893 A1* | 2/2019 | Chen | | G06V 40/70 |
| 2019/0086988 A1* | 3/2019 | He | | G06F 1/3212 |
| 2019/0392123 A1* | 12/2019 | Larsen | | G06F 21/31 |
| 2020/0026835 A1* | 1/2020 | Mitchell | | H04L 9/3247 |
| 2021/0306147 A1* | 9/2021 | Aharoni | | G06F 21/32 |
| 2021/0342427 A1* | 11/2021 | Popov | | G06F 21/316 |
| 2022/0067131 A1* | 3/2022 | Lock | | G06F 21/32 |
| 2022/0075861 A1* | 3/2022 | Nicol | | G06F 21/32 |
| 2022/0115137 A1* | 4/2022 | Goldstein | | G16H 10/60 |
| 2022/0269759 A1* | 8/2022 | Lee | | H04W 12/30 |
| 2022/0417359 A1* | 12/2022 | Tokuyama | | H04Q 9/00 |
| 2023/0095810 A1* | 3/2023 | Mousavi | | G06F 18/253 |
| | | | | 706/15 |
| 2023/0153743 A1* | 5/2023 | Kaneria | | G06Q 10/083 |
| | | | | 705/332 |
| 2023/0206233 A1* | 6/2023 | Aument | | G06Q 20/4016 |
| | | | | 705/44 |
| 2023/0316284 A1* | 10/2023 | Kramme | | G06Q 20/34 |
| | | | | 705/44 |
| 2023/0379763 A1* | 11/2023 | Soryal | | H04W 28/24 |
| 2024/0330423 A1* | 10/2024 | Albero | | G06F 21/316 |

FOREIGN PATENT DOCUMENTS

| | | | | |
|---|---|---|---|---|
| WO | WO-2019084510 A1 * | 5/2019 | | G06F 21/74 |
| WO | WO-2019143445 A2 * | 7/2019 | | G05B 15/02 |
| WO | WO-2019212412 A1 * | 11/2019 | | |

* cited by examiner

USER AUTHENTICATION USING A MOBILE DEVICE

TECHNICAL FIELD

The disclosed subject matter relates to user authentication and, more particularly, to machine-learning based user authentication using a mobile device.

BACKGROUND

User authentication, particularly on mobile devices, has not experienced significant change since the introduction of mobile phones. While modern smartphones have implemented fingerprint and facial recognition technologies, these technologies merely supplement passcodes, which have been the primary form of authentication of mobile phones dating back to basic flip phones or even earlier. Passcodes, however, can be circumvented or stolen, meaning that unintended or unauthorized access to a mobile devices can be obtained. This is increasingly problematic, as modern smartphones are already replacing the wallet, and are evolving into a gateway to the internet of things, from smart home devices to connected cars and health sensors.

The above-described background relating to user authentication is merely intended to provide a contextual overview of some current issues and is not intended to be exhaustive. Other contextual information may become further apparent upon review of the following detailed description.

DETAILED DESCRIPTION

Figure 1:
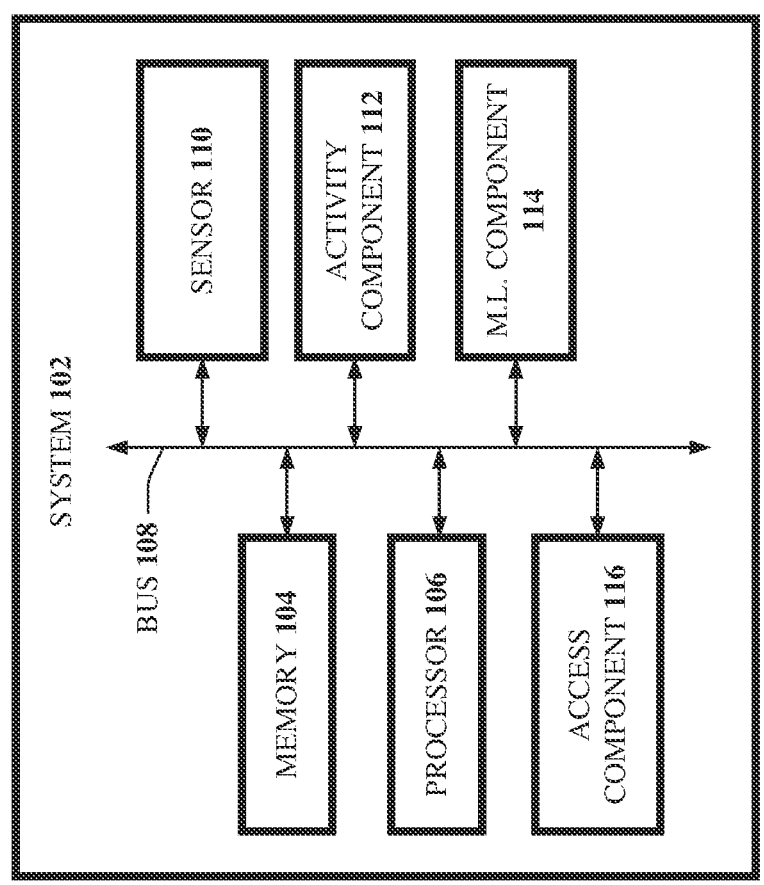
FIG. 1 is a block diagram of an exemplary system in accordance with one or more embodiments described herein.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As alluded to above, user authentication (e.g., using a mobile device) can be improved in various ways, and various embodiments are described herein to this end and/or other ends.

According to an embodiment, a system can comprise a processor, and a memory that stores executable instructions that, when executed by the processor, facilitate performance of operations, comprising: based on an output of a sensor of a mobile device, determining motion data representative of motion of the mobile device, determining, based on the motion data and using an authentication model, whether the motion of the mobile device threshold matches a motion pattern associated with an authorized user profile authorized to access a feature of the mobile device, wherein the motion pattern has been determined based on machine learning applied to past motion of the mobile device other than the motion of the mobile device, and wherein the authentication model has been generated based on machine learning applied to the motion pattern, and based on a determination that the motion of the mobile device does not threshold match the motion pattern, blocking access to the feature of the mobile device.

In various embodiments, the sensor can comprise an accelerometer, and the motion of the mobile device can comprise a speed, angle, or motion range of the mobile device. In further embodiments, the sensor can comprise a pressure sensor, and the motion of the mobile device can comprise a degree of force of applied to a touch screen of the mobile device.

In some embodiments, the above operations can further comprise: in response to blocking access to the feature of the mobile device, generating a prompt for an alternate authentication feature associated with the authorized user profile, and displaying the prompt via a graphical user interface of the mobile device, wherein the alternate authentication feature comprises a comparison of an input at the mobile device with a defined input known to be associated with the authorized user profile, and in response to the alternate authentication feature being determined to be completed via the mobile device, unblocking access to the feature of the mobile device. In some embodiments, the defined input can comprise a prerecorded video clip associated with the authorized user profile, the alternate authentication feature can comprise a comparison of the prerecorded video clip and a live stream captured by a camera of the mobile device, and the above operations further comprise: in response to the live stream and the prerecorded video clip being determined to comprise a threshold similarity according to a similarity criterion, unblocking access to the feature of the mobile device. In further embodiments, the defined input can comprise a prerecorded audio clip associated with the authorized user profile, the alternate authentication feature comprises a comparison of the prerecorded audio clip and a live stream captured by a microphone of the mobile device, and the above operations can further comprise: in response to the live stream and the prerecorded audio clip being determined to comprise a threshold similarity according to a similarity criterion, unblocking access to the feature of the mobile device.

In one or more embodiments, the feature can comprise an application of the mobile device or a hardware component of the mobile device.

It is noted that, in various embodiments, the above operations further comprise: determining an input received at the mobile device, determining, based on the input and using the authentication model, whether the input threshold matches an input pattern associated with the authorized user profile, wherein the input pattern has been determined based on the machine learning applied to past inputs at the mobile device other than the input, and wherein the authentication model has been further generated based on the machine learning applied to the input pattern, and based on a determination that the input does not threshold match the input pattern, blocking the access to the feature of the mobile device. In some embodiments, the input pattern can comprise a habitual user input associated with the authorized user profile, and the habitual user input can comprise a sequence of inputs received via the mobile device. In further embodiments, the input pattern can comprise an application accessed for a threshold amount of time during a defined time window.

In another embodiment, a non-transitory machine-readable medium can comprise executable instructions that, when executed by a processor, facilitate performance of operations, comprising: determining an input received via a mobile device, determining, based on the input and using an authentication model, whether the input threshold matches an input pattern associated with an authorized user profile authorized to access a feature of the mobile device, wherein the input pattern has been determined based on machine learning applied to past inputs at the mobile device other than the input, and wherein the authentication model has been generated based on the machine learning applied to the input pattern, and based on a determination that the input at the mobile device is associated with an authorized user profile, granting access to the feature of the mobile device. It is noted that the past inputs at the mobile device can be determined using a tracking cookie installed on the mobile device.

In various embodiments, the feature can comprise an unlock function, executable by the mobile device and configured to unlock a door of a vehicle communicatively coupled to the mobile device. In some embodiments, the feature can comprise a package release request function, executable by the mobile device and configured to generate a package release request signal and to send the package release request signal to a device associated with a delivery entity. In this regard, the package release request function can be registered with the delivery entity. In additional embodiments, the feature can comprise a graphic representation, rendered via a graphical user interface of the mobile device, of vaccine data representative of a vaccine associated with the authorized user profile. In further embodiments, the feature can comprise graphic representation, rendered via a graphical user interface of the mobile device, of an identification card associated with the authorized user profile.

According to yet another embodiment, a method can comprise: receiving, by a first device comprising a processor from a second device, a request to initiate an audio communication with the second device, wherein the request to initiate the audio communication comprises an audio authentication signal, determining, by the first device, whether a frequency pattern of the audio authentication signal threshold matches a defined audio frequency pattern, and in response to the frequency pattern being determined, by the first device, not to threshold match the defined audio frequency pattern, transmitting, by the first device to the second device, alert information representative of a warning that the request to initiate the audio communication is unauthorized.

In some embodiments, the defined audio frequency pattern comprises a frequency range inaudible to a human ear.

In various embodiments, the method can further comprise: in response to the frequency pattern being determined, by the first device, not to threshold match the defined audio frequency pattern, terminating, by the first device, the audio communication with the second device.

In additional embodiments, the method can further comprise: in response to the frequency pattern being determined, by the first device, not to threshold match the defined audio frequency pattern, requesting, by the first device, an alternate authentication of the second device.

It should be appreciated that additional manifestations, configurations, implementations, protocols, etc. can be utilized in connection with the following components described herein or different/additional components as would be appreciated by one skilled in the art.

Turning now to FIG. 1, there is illustrated an example, non-limiting system 102 in accordance with one or more embodiments herein. System 102 can comprise a computerized tool, which can be configured to perform various operations relating to user authentication. The system 102 can comprise one or more of a variety of components, such as memory 104, processor 106, bus 108, sensor 110, activity component 112, machine learning (M.L.) component 114, and/or access component 116.

In various embodiments, one or more of the memory 104, processor 106, bus 108, sensor 110, activity component 112, M.L. component 114, and/or access component 116 can be communicatively or operably coupled (e.g., over a bus or wireless network) to one another to perform one or more functions of the system 102.

According to an embodiment, the activity component 112 can, based on an output of a sensor (e.g., sensor 110) of a mobile device (e.g., a smartphone), determine motion data representative of motion of the mobile device. According to an example, such a mobile device can comprise the system 102. In other examples, such a mobile device can be communicatively coupled to the system 102. According to an embodiment, the sensor 110 can comprise an accelerometer. In this regard, the motion of the mobile device can comprise a speed, angle, or motion range of the mobile device. In further embodiments, the sensor 110 can comprise a pressure sensor. In this regard, the motion of the mobile device can comprise a degree of force of applied to a touch screen of the mobile device. In additional embodiments, the sensor 110 can comprise one or more of an accelerometer, gyroscope, magnetometer, GPS, biometric sensors, miniature radar sensor (e.g., which detects movement near a device), LiDAR, barometer, proximity sensor, ambient light sensor, humidity sensor, gesture sensor, or another suitable sensor. In this regard, such motion or movements can comprise (e.g., in terms of speed, angles, motion range, or other suitable metrics) user habits, such as how a user retrieves the device from her purse, how the device is positioned during the night, how the device is placed in the charger, how user typically walks in a given context (e.g., location), time of activities or other suitable contexts, or other suitable movements. It is noted that such habitual user movements or activities can be representative of use of the mobile device by that user profile (e.g., authorized use). In this regard, an unauthorized user (e.g., a thief) would not exhibit the same habits and/or patterns.

According to an embodiment, the activity component 112 can determine (e.g., based on the motion data and using an authentication model) whether the motion of the mobile device threshold matches a motion pattern associated with an authorized user profile authorized to access a feature of the mobile device. It is noted that in various embodiments, the motion pattern can be determined (e.g., using the M.L. component 114) based on machine learning applied to past motion of the mobile device other than the motion of the mobile device. For example, motions of a mobile device can be tracked over time, and such motions can be associated with the authorized user profile to determine signature movements associated with the authorized user profile. Further in this regard, the authentication model can be generated (e.g., using the M.L. component 114) based on machine learning applied to the motion pattern. In one or more embodiments, the feature can comprise an application of the mobile device or a hardware component of the mobile device.

According to an embodiment, the access component 116 can, based on a determination (e.g., by the activity component 112 and/or M.L. component 114) that the motion of the mobile device does not threshold match the motion pattern, block access to the feature of the mobile device. In this regard, the access component 116 can block access to one or more software and/or hardware components of the mobile device. For example, the access component 116 can block access to banking applications, social media applications, games, smart home features, music, photos or videos, navigation applications, password managers, authentication applications, calendars, settings, notes, the phone dialer (e.g., except for emergency numbers), emails, cellular radios, cameras, speakers, microphones, sensors, communicatively coupled devices, or other suitable features.

In additional embodiments, the activity component 112 can determine an input received at the mobile device and determine, based on the input and using the authentication model, whether the input threshold matches an input pattern associated with the authorized user profile. For example, such inputs can comprise websites visited (e.g., order and/or frequency) and activities inside these visited websites (e.g., checking certain friend's profile or political news) (e.g., tracked using a tracking cookie), the way in which an icon is pressed (e.g., pressure of touch, length of press) (e.g., via a touch screen sensor), how quickly the user finds the most visited webpages or apps (e.g., tracked using a tracking cookie), the way in which the user reacts to particular news (e.g., user shakes the phone hard in certain direction if the weather is too cold), wake up times, sleep times, commute times (e.g., determined using the phone's internal sensor(s) and moving patterns), camera usage (e.g., how the user holds device and/or objects being photographed), user movement behavior (e.g., hand motion around the phone such as the way to approach it to hold it) (e.g., via a Soli sensor), correlation(s) between temperature and movement activity, or other suitable inputs. In this regard, the input pattern can be determined (e.g., using the M.L. component 114) based on the machine learning applied to past inputs at the mobile device other than the input. For example, inputs associated with a mobile device can be tracked over time, and such inputs can then be associated with the authorized user profile. In this regard, signature inputs associated with the authorized user profile can be determined (e.g., using the M.L. component 114). According to an embodiment, the authentication model can be further generated (e.g., using the M.L. component 114) based on the machine learning applied to the input pattern (e.g., a signature input pattern). It is noted that, based on a determination (e.g., by the M.L. component 114) that the input does not threshold match the input pattern, the access component 116 can block the access to the feature of the mobile device. In various embodiments, the input pattern can comprise a habitual user input determined to be associated with the authorized user profile. In this regard, the habitual user input can comprise a sequence of inputs received via the mobile device. In further embodiments, the input pattern can comprise an application accessed for a threshold amount of time during a defined time window.

According to an embodiment, authentication herein can be context-specific. For example, the M.L. component 114 and/or activity component 112 can determine a user profile's activities (e.g., from chats, emails, GPS, or other information available via a mobile device) to determine how movement behavior changes or might change in certain context(s). For example, if a user is determined to be running a marathon on a specific day, walking by the beach at a specific time, or engaged in another activity, the M.L. component 114 and/or activity component 112 can adjust the authentication inputs or motions and/or associated patterns or thresholds based on the new events/circumstances. In this regard, an authentication server (e.g., authentication server 604 as later discussed in greater detail) can comprise information representative of the general population's experience (e.g., average movements or inputs) during such events, so the M.L. component 114, access component 116, and/or activity component 112 would not be triggered (e.g., for potential accidental failed authentication of an authorized user profile).

Various embodiments herein can employ artificial-intelligence or machine learning systems and techniques to facilitate learning user behavior, context-based scenarios, preferences, etc. in order to facilitate taking automated action with high degrees of confidence. Utility-based analysis can be utilized to factor benefit of taking an action against cost of taking an incorrect action. Probabilistic or statistical-based analyses can be employed in connection with the foregoing and/or the following.

It is noted that systems and/or associated controllers, servers, or machine learning components herein can comprise artificial intelligence component(s) which can employ an artificial intelligence (A.I.) model and/or M.L. or an M.L. model that can learn to perform the above or below described functions (e.g., via training using historical training data and/or feedback data).

In some embodiments, M.L. component 114 can comprise an A.I. and/or M.L. model that can be trained (e.g., via supervised and/or unsupervised techniques) to perform the above or below-described functions using historical training data comprising various context conditions that correspond to various augmented network optimization operations. In this example, such an A.I. and/or M.L. model can further learn (e.g., via supervised and/or unsupervised techniques) to perform the above or below-described functions using training data comprising feedback data, where such feedback data can be collected and/or stored (e.g., in memory) by the M.L. component 114. In this example, such feedback data can comprise the various instructions described above/ below that can be input, for instance, to a system herein, over time in response to observed/stored context-based information.

A.I./M.L. components herein can initiate an operation(s) associated with a based on a defined level of confidence determined using information (e.g., feedback data). For example, based on learning to perform such functions described above using feedback data, performance information, and/or past performance information herein, an M.L. component 114 herein can initiate an operation associated with determining various thresholds herein (e.g., a motion pattern thresholds, input pattern thresholds, similarity thresholds, authentication signal thresholds, audio frequency thresholds, or other suitable thresholds).

In an embodiment, the M.L. component 114 can perform a utility-based analysis that factors cost of initiating the above-described operations versus benefit. In this embodiment, the M.L. component 114 can use one or more additional context conditions to determine various thresholds herein.

To facilitate the above-described functions, a M.L. component 114 herein can perform classifications, correlations, inferences, and/or expressions associated with principles of artificial intelligence. For instance, the M.L. component 114 can employ an automatic classification system and/or an automatic classification. In one example, the M.L. component 114 can employ a probabilistic and/or statistical-based analysis (e.g., factoring into the analysis utilities and costs) to learn and/or generate inferences. The M.L. component 114 can employ any suitable machine-learning based techniques, statistical-based techniques and/or probabilistic-based techniques. For example, the M.L. component 114 can employ expert systems, fuzzy logic, support vector machines (SVMs), Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, and/or the like. In another example, the M.L. component 114 can perform a set of machine-learning computations. For instance, the M.L. component 114 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations.

Figure 2:
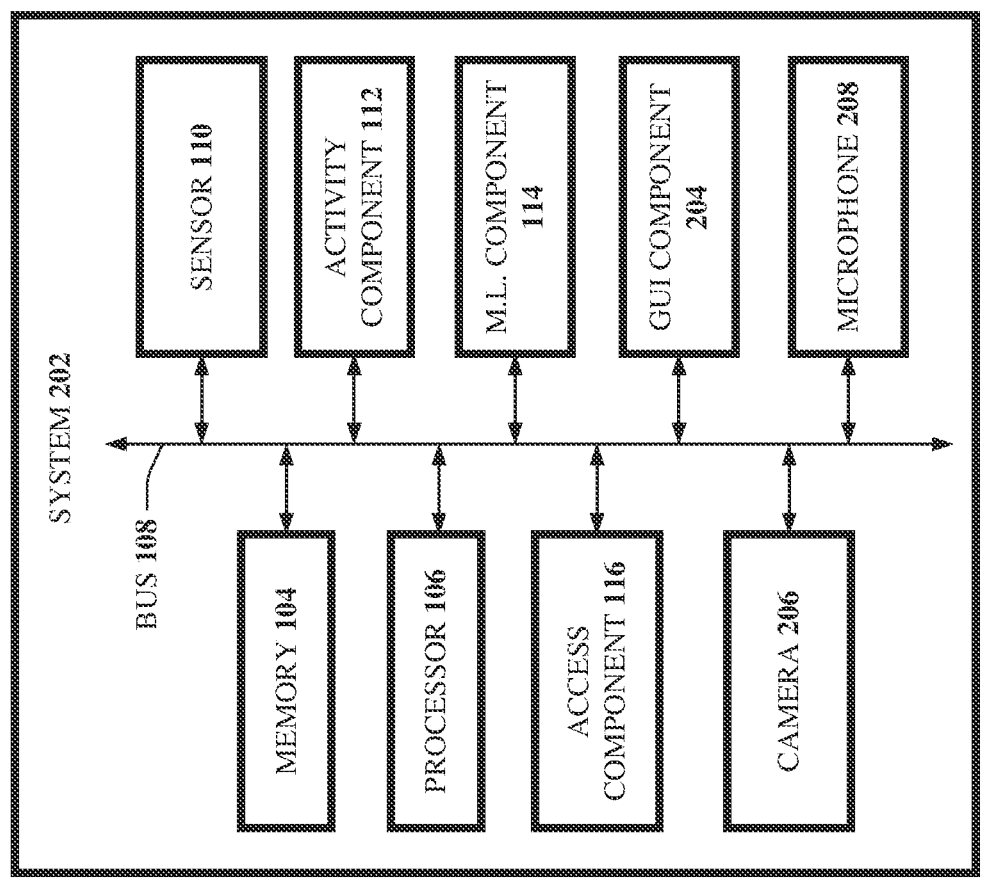
FIG. 2 is a block diagram of an exemplary system in accordance with one or more embodiments described herein.

Turning now to FIG. 2, there is illustrated an example, non-limiting system 202 in accordance with one or more embodiments herein. System 202 can comprise a computerized tool, which can be configured to perform various operations relating to user authentication. The system 202 can be similar to system 102, and can comprise one or more of a variety of components, such as memory 104, processor 106, bus 108, sensor 110, activity component 112, M.L. component 114, and/or access component 116. The system 202 can additionally comprise a graphical user interface (GUI) component 204, camera 206, and/or microphone 208.

In various embodiments, one or more of the memory 104, processor 106, bus 108, sensor 110, activity component 112, M.L. component 114, access component 116, GUI component 204, camera 206, and/or microphone 208 can be communicatively or operably coupled (e.g., over a bus or wireless network) to one another to perform one or more functions of the system 202.

According to an embodiment, in response to blocking (e.g., by the access component 116) access to a feature of the mobile device, the access component 116 can generate a prompt for an alternate authentication feature associated with the authorized user profile. It is noted that the alternate authentication feature can comprise a comparison of an input at the mobile device with a defined input known to be associated with the authorized user profile. In this regard, the prompt can be displayed via the GUI component 204. For example, the GUI component 204 can render and/or display graphical user data via a touch screen or other screen or a mobile device. Further, in response to the alternate authentication feature being determined to be completed via the mobile device (e.g., via the GUI component 204), the access component 116 can unblock access to the feature of the mobile device.

In an embodiment, the defined input can comprise a prerecorded video clip associated with the authorized user profile. In this regard, the alternate authentication feature can comprise a comparison of the prerecorded video clip and a live stream captured by a camera (e.g., camera 206) of the mobile device. For example, the prerecorded clip can comprise a secret word or phrase (e.g., a verbal passcode) and/or associated tone of voice. In other examples the prerecorded clip can comprise defined movements or gestures (e.g., an eyebrow movement, a wink, a smile, or another defined movement or gesture). Further in this regard, the access component 116 can, in response to the live stream and the prerecorded video clip being determined (e.g., by the access component 116 and/or M.L. component 114) to comprise a threshold similarity according to a similarity criterion, unblock access to the feature of the mobile device. For example, if the live stream and prerecorded video clip are determined by the access component 116 to be threshold similar, the user currently using the mobile device can be determined by the access component 116 to be associated with the authorized user profile.

In another embodiment, the defined input can comprise a prerecorded audio clip associated with the authorized user profile. In this regard, the alternate authentication feature can comprise a comparison of the prerecorded audio clip and a live stream captured by a microphone (e.g., microphone 208) of the mobile device. For example, the prerecorded clip can comprise a secret word or phrase (e.g., a verbal passcode) and/or associated tone of voice. Further in this regard, the access component 116 can in response to the live stream and the prerecorded audio clip being determined (e.g., by the access component 116 and/or M.L. component 114) to comprise a threshold similarity according to a similarity criterion, unblock access to the feature of the mobile device. For example, if the live stream and prerecorded audio clip are determined by the access component 116 to be threshold similar, the user currently using the mobile device can be determined by the access component 116 to be associated with the authorized user profile.

Figure 3:
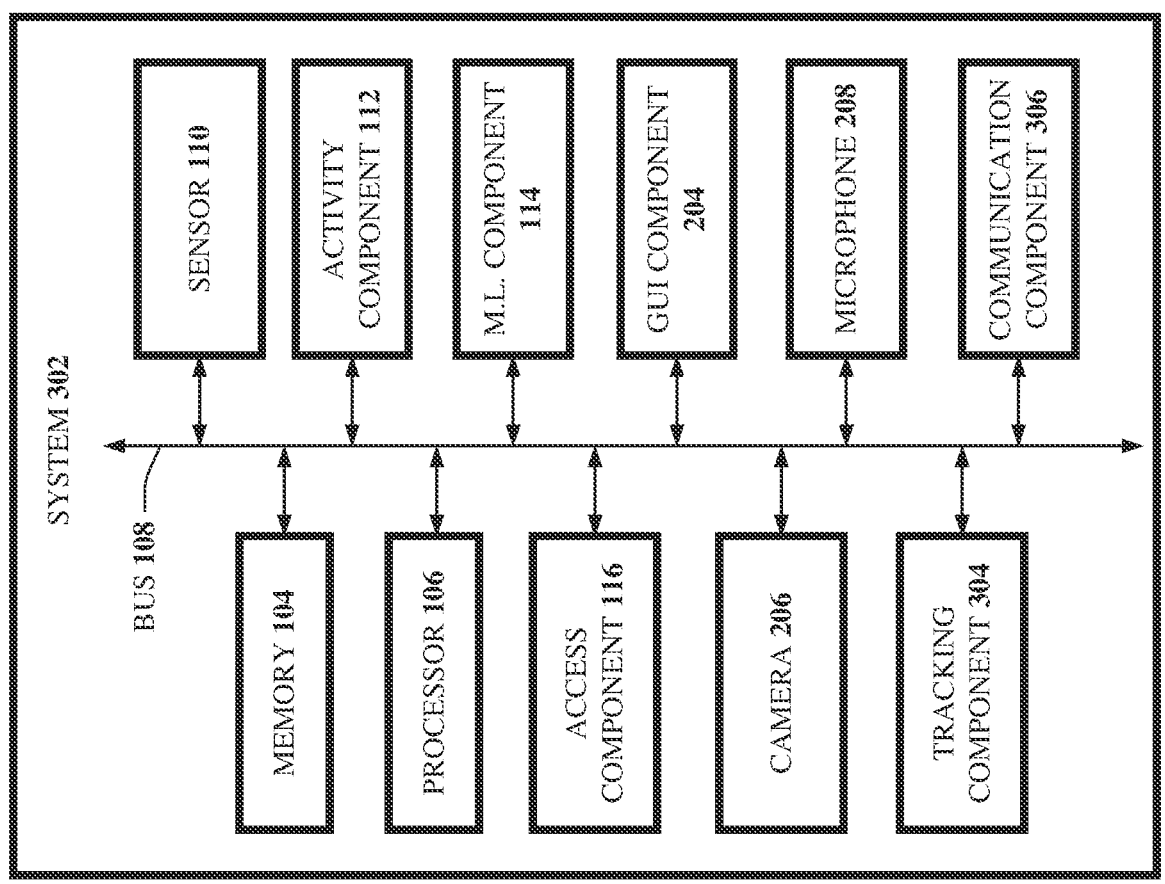
FIG. 3 is a block diagram of an exemplary system in accordance with one or more embodiments described herein.

Turning now to FIG. 3, there is illustrated an example, non-limiting system 302 in accordance with one or more embodiments herein. System 302 can comprise a computerized tool, which can be configured to perform various operations relating to user authentication. The system 302 can be similar to system 202, and can comprise one or more of a variety of components, such as memory 104, processor 106, bus 108, sensor 110, activity component 112, M.L. component 114, access component 116, GUI component 204, camera 206, and/or microphone 208. The system 302 can additionally comprise a tracking component 304 and/or communication component 306.

In various embodiments, one or more of the memory 104, processor 106, bus 108, sensor 110, activity component 112, M.L. component 114, access component 116, GUI component 204, camera 206, microphone 208, tracking component 304, and/or communication component 306 can be communicatively or operably coupled (e.g., over a bus or wireless network) to one another to perform one or more functions of the system 302.

According to an embodiment, the activity component 112 can determine an input received via a mobile device and, based on the input and using an authentication model, determine whether the input threshold matches an input pattern associated with an authorized user profile authorized to access a feature of the mobile device. For example, if input and input pattern are determined by the activity component 112 (or the M.L. component 114) to be threshold similar, the user currently using the mobile device can be determined by the activity component 112 (or M.L. component 114) to be associated with the authorized user profile. In this regard, the input pattern can be determined (e.g., by the M.L. component 114) based on machine learning applied to past inputs at the mobile device other than the input. Further in this regard, the authentication model can be generated (e.g., by the M.L. component 114) based on the machine learning applied to the input pattern. In an embodiment, the access component 116 can, based on a determination that the input at the mobile device is associated with an authorized user profile, grant access to the feature of the mobile device.

According to an embodiment, the past inputs at the mobile device can be determined (e.g., by the tracking component 304) using a tracking cookie installed (e.g., by the tracking component 304) on the mobile device. In further embodiments, the tracking cookie can track user activity on the mobile device itself in addition to interaction between the mobile device and a network (e.g., a cloud-based network) (e.g., via phone calls, app usage, Internet surfing, or other suitable activity. For fully obscured or encrypted activities or applications to which the tracking cookie does not have full access (e.g., on a respective mobile device), the tracking cookie can track usage time/duration, CPU usage, bandwidth, and/or memory consumption while those activities are occurring or while those applications are in use. According to an embodiment, the tracking cookie can be destroyed (e.g., by the tracking component 304) in response to authentication failing (e.g., to protect user privacy).

According to an embodiment, a feature herein can comprise an unlock function, executable by the mobile device (e.g., comprising a system 302) and configured to unlock a door of a vehicle communicatively coupled to the mobile device. In this regard, the mobile device comprising the system 302 can unlock a vehicle when the mobile device is within a defined distance of the vehicle (e.g., via a signal send by the communication component 306). It is noted that such a vehicle can comprise a ride-sharing vehicle or taxi. In other embodiments, such a vehicle can comprise a personal vehicle or a shared vehicle. In this regard, the mobile device can be registered with the vehicle (e.g., for unlocking or locking). According to an example, the mobile device comprising the system 302 can unlock the vehicle in response to a successful authentication, but can be prevented from unlocking the vehicle absent a successful authentication.

According to an embodiment, the feature comprises a package release request function, executable by the mobile device and configured to generate a package release request signal and to send the package release request signal (e.g., via the communication component 306) to a device associated with a delivery entity. In this regard, the package release request function can be registered with the delivery entity. For example, the mobile device comprising the system 302 can send the package release request signal when the mobile device is within a defined distance of the device (e.g., a package scanner) associated with the delivery entity. According to an example, the mobile device comprising the system 302 can send the package release signal in response to a successful authentication, but can be prevented from sending the package release signal absent a successful authentication.

It is noted that the communication component 306 can comprise the hardware required to implement a variety of communication protocols (e.g., infrared ("IR"), shortwave transmission, near-field communication ("NFC"), Bluetooth, Wi-Fi, long-term evolution ("LTE"), 3G, 4G, 5G, 6G, global system for mobile communications ("GSM"), code-division multiple access ("CDMA"), satellite, visual cues, radio waves, etc.)

Figure 4:
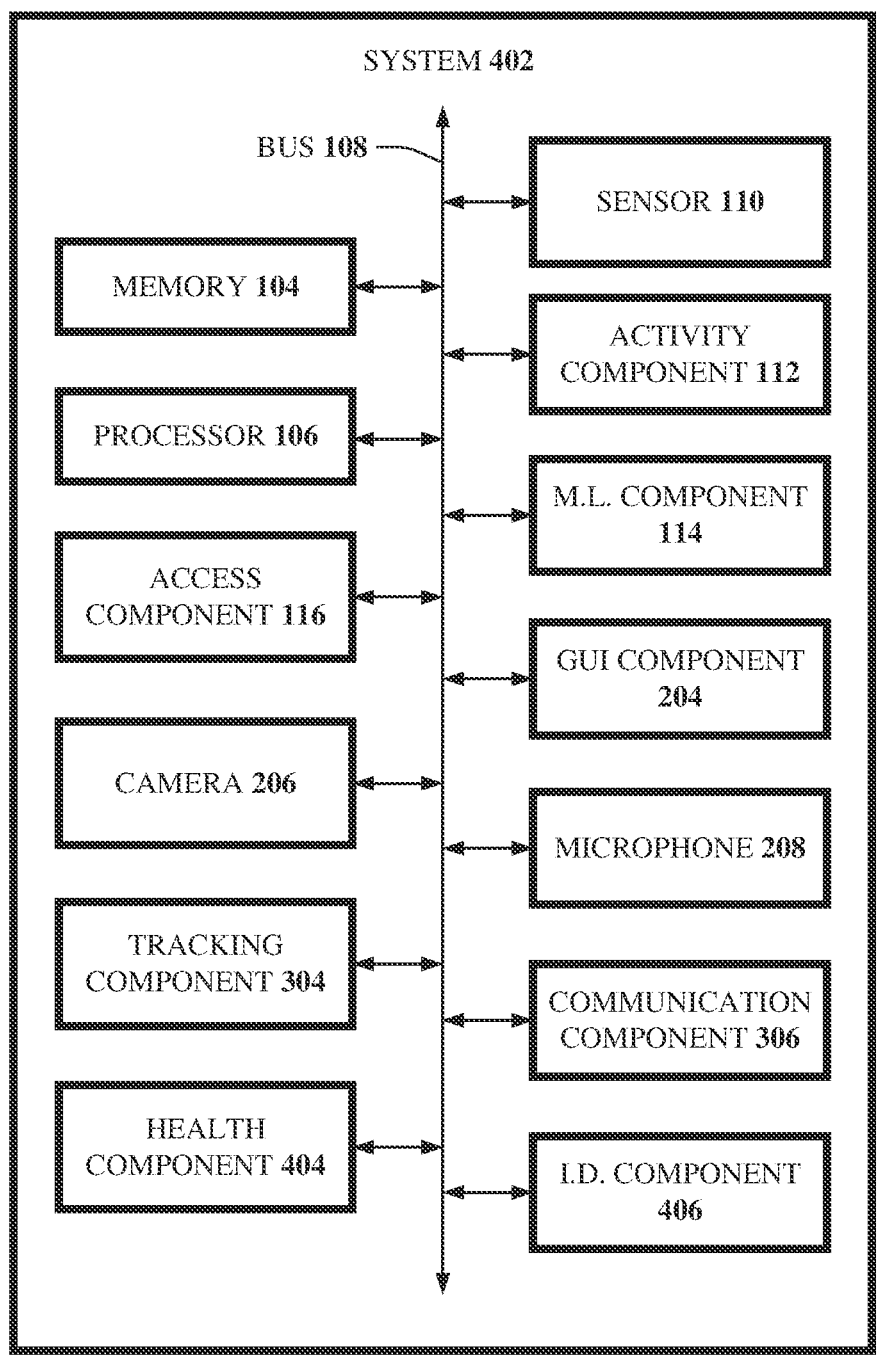
FIG. 4 is a block diagram of an exemplary system in accordance with one or more embodiments described herein.

Turning now to FIG. 4, there is illustrated an example, non-limiting system 402 in accordance with one or more embodiments herein. System 402 can comprise a computerized tool, which can be configured to perform various operations relating to user authentication. The system 402 can be similar to system 302, and can comprise one or more of a variety of components, such as memory 104, processor 106, bus 108, sensor 110, activity component 112, M.L. component 114, access component 116, GUI component 204, camera 206, microphone 208, tracking component 304 and/or communication component 306. The system 402 can additionally comprise a health component 404 and/or I.D. component 406.

In various embodiments, one or more of the memory 104, processor 106, bus 108, sensor 110, activity component 112, M.L. component 114, access component 116, GUI component 204, camera 206, microphone 208, tracking component 304, communication component 306, health component 404, and/or I.D. component 406 can be communicatively or operably coupled (e.g., over a bus or wireless network) to one another to perform one or more functions of the system 402.

According to an embodiment, a feature herein can comprise graphic representation, rendered via a graphical user interface (e.g., a touch screen) (e.g., via the GUI component 204) of the mobile device, of vaccine data (e.g., stored or accessed using a health component 404) representative of a vaccine associated with the authorized user profile. In further embodiments, the graphic representation can comprise other suitable health data. In this regard, the health component 404 can store and/or access (e.g., via the communication component 306) a variety of health data associated with the authorized user profile. For example, the health data can comprise a vaccine status, such as an influenza vaccination status or a COVID-19 vaccination status. In this regard, the health component 404 can be communicatively coupled to various government or healthcare reporting systems for vaccination status or other suitable health data. According to an example, the graphic representation can comprise a QR code that provides a confirmation of a vaccination status. In other examples, the graphic representation can comprise a confirmation of a health test result (e.g., a COVID-19 test or another medical test).

According to an embodiment, a feature herein can comprise graphic representation, rendered via a graphical user interface (e.g., a touchscreen) (e.g., using a GUI component 204) of the mobile device, of an identification card (e.g., a graphic representation of an identification card or other suitable identification information) associated with the authorized user profile. In this regard, the I.D. component 406 can store a variety of identification data associated with the authorized user profile. For example, the identification card can comprise a driver's license or another state ID card. In further embodiments, the identification card can comprise a passport. In additional embodiments, the identification card can comprise a hotel key, cruise ship key, a ticket, or another type of identification card.

Figure 5:
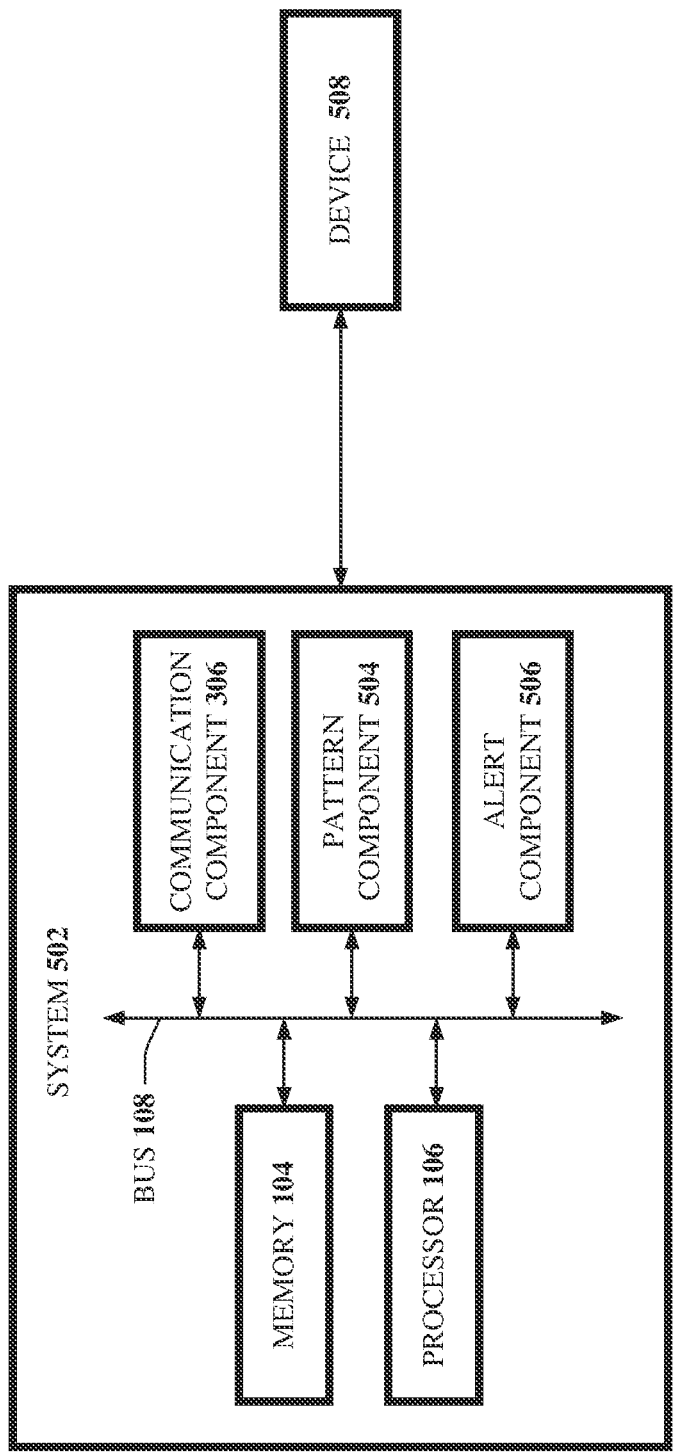
FIG. 5 is a block diagram of an exemplary system in accordance with one or more embodiments described herein.

Turning now to FIG. 5, there is illustrated an example, non-limiting system 502 in accordance with one or more embodiments herein. System 502 can comprise a computerized tool, which can be configured to perform various operations relating to user authentication. The system 502 can comprise one or more of a variety of components, such as memory 104, processor 106, bus 108, communication component 306, pattern component 504, and/or alert component 506. In various embodiments, the system 502 can be communicatively coupled to a device (e.g., a mobile device such as a smart phone) 508.

In various embodiments, one or more of the memory 104, processor 106, bus 108, communication component 306, pattern component 504, and/or alert component 506 can be communicatively or operably coupled (e.g., over a bus or wireless network) to one another to perform one or more functions of the system 502.

According to an embodiment, the communication component 306 can receive (e.g., from the device 508) a request to initiate an audio communication with the device 508. In this regard, the request to initiate the audio communication can comprise an audio authentication signal. It is noted that such a request can comprise a one-way or two-way authentication request depending on, for instance, the quantity of devices comprising such a system 502. According to an example, the communication component 306 can determine a call on a native dialer of a mobile device by monitoring native dialer processes and a call setup stage (e.g., normally conducted in session initiation protocol (SIP) signaling). In this regard, the communication component 306 can insert a code that can be relayed to a core network (e.g., via a cellular network) and/or the other device (e.g., device 508) to determine whether to trust the other device (e.g., device 508) (e.g., whether the device 508 is authenticated). In various embodiments, if a device comprising the system 502 is attempting to engage in a communication with another device (e.g., device 508) also comprising a system 502, authentication can occur via an authentication server (e.g., authentication server 604 as later discussed in greater detail), as both systems 502 can be registered with such an authentication server. Further, if several devices comprising the system 502 are engaged in a communication, but one or more participant devices in the communication do not comprise the system 502, the authentication server can prompt such a device (e.g., a device that does not comprise the system 502) via a web browser of the respective device to install required software and/or hardware components associated with the system 502. In one or more embodiments, the audio communication can comprise a voice over internet protocol (VoIP) communication, a voice over LTE (VoLTE), 5G, or 6G-based communication.

According to an embodiment, the pattern component 504 can determine whether a frequency pattern of the audio authentication signal threshold matches a defined audio frequency pattern. It is noted that the defined audio frequency pattern can comprise a frequency range inaudible to a human ear, like frequencies utilized by dog whistles (e.g., 23 to 54 kHz).

According to an embodiment, in response to the frequency pattern being determined (e.g., by the pattern component 504) not to threshold match the defined audio frequency pattern, the alert component 506 can transmit (e.g., via the communication component 306) alert information representative of a warning that the request to initiate the audio communication is unauthorized. In this regard, the alert can be transmitted via one or more components of the mobile device comprising the system 502 or to the device 508 (e.g., via the communication component 306). In further embodiments, in response to the frequency pattern being determined (e.g., by the pattern component 504) not to threshold match the defined audio frequency pattern, the communication component 306 can terminate the audio communication with the device 508. In additional embodiments, in response to the frequency pattern being determined (e.g., by the pattern component 504) not to threshold match the defined audio frequency pattern, the communication component 306 can request an alternate authentication (e.g., an alternate authentication as previously discussed) of the device 508.

Figure 6:
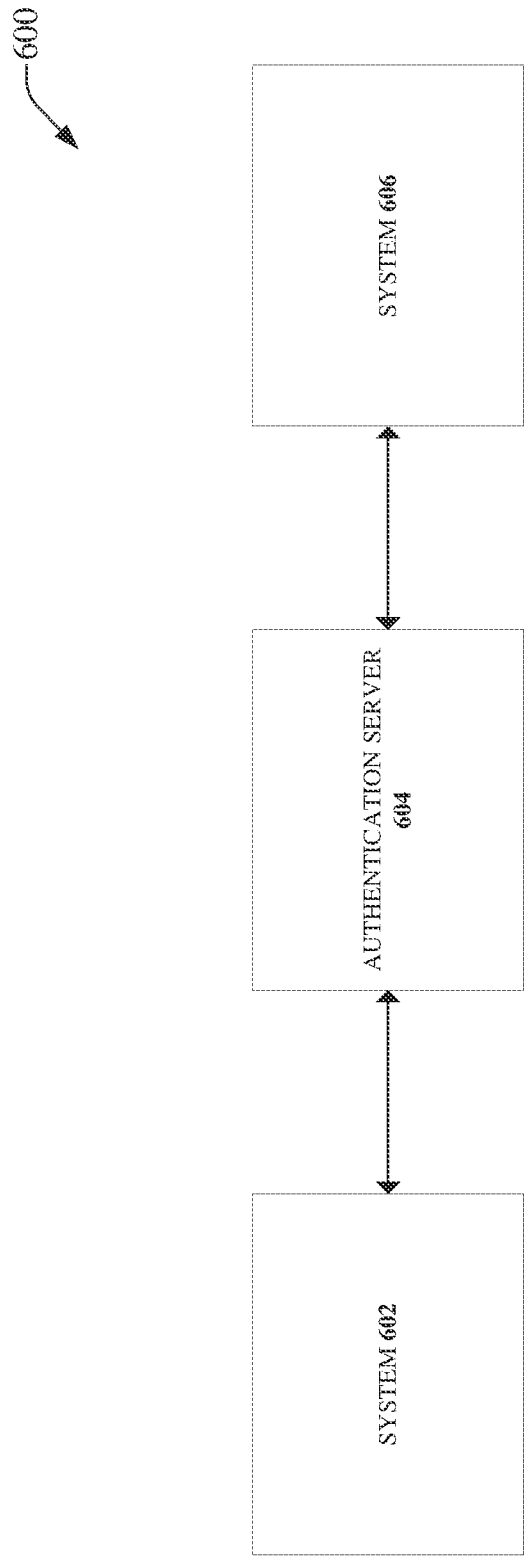
FIG. 6 is a block diagram of an exemplary system topology in accordance with one or more embodiments described herein.

With reference to FIG. 6, there is illustrated an exemplary system topology 600 in accordance with one or more embodiments described herein. It is noted that the system 602 and/or system 606 can be similar to one or more of the system 102, system 202, system 302, system 402, and/or system 502 herein. In this regard, authentications determined by systems herein can be transmitted (e.g., via a respective communication component 306) to an authentication server 604. Similarly, the authentication server 604 can transmit authentications to one or more of a system 602 and/or system 606. In this regard, the authentication server 604 can generate and/or distribute a signal associated with such an authentication. For example, the authentication server 604 can transmit information representative of an authentication that indicates that an entity that just unlocked a mobile device is the actual authorized device owner (e.g., and is associated with an authorized user profile), and not an entity that stole a username/password or passcode.

Figure 7:
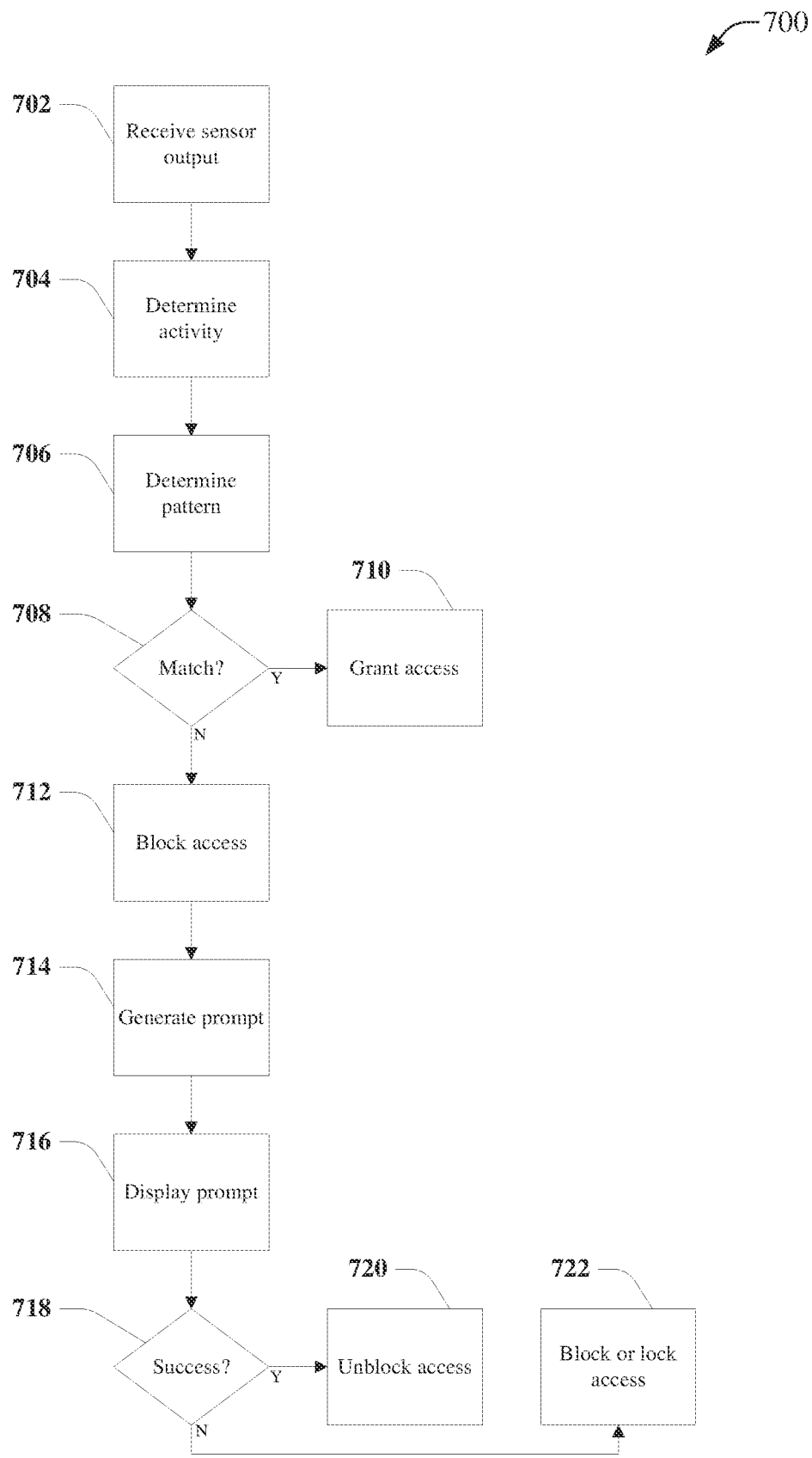
FIG. 7 is a flowchart for a process associated with machine-learning based user authentication in accordance with one or more embodiments described herein.

Turning now to FIG. 7, there is illustrated a flowchart of a process 700 relating to machine-learning based user authentication in accordance with one or more embodiments described herein. At 702 a sensor output (e.g., from a sensor 110) can be accessed and/or received (e.g., by an activity component 112). At 704, activity (e.g., motion data representative of motion of a mobile device) can be determined (e.g., using an activity component 112). At 706, it can be determined (e.g., based on the motion data and using an authentication model) (e.g., by an M.L. component 114) whether the motion of the mobile device threshold matches a motion pattern (e.g., a motion signature) associated with an authorized user profile authorized to access a feature of the mobile device. In this regard, the motion pattern can be determined based on machine learning applied (e.g., by the M.L. component 114) to past motion of the mobile device other than the motion of the mobile device, and the authentication model can be generated based on machine learning applied (e.g., by the M.L. component 114) to the motion pattern. At 708, if the motion of the mobile device threshold matches the motion pattern associated with an authorized user profile, access to the feature can be granted (e.g., by the access component 116) at 710. If at 708, the motion of the mobile device does not threshold match the motion pattern associated with an authorized user profile, the process can proceed to 712 at which access to the feature is blocked (e.g., by the access component 116). At 714, a prompt can be generated (e.g., by the access component 116) for an alternate authentication feature associated (e.g., as previously discussed) with the authorized user profile. At 716, the prompt can be displayed (e.g., via a GUI of a mobile device) (e.g., via the GUI component 204). At 718, if the alternate authentication feature is successfully completed, the process can proceed to 720 at which access to the feature is unblocked (e.g., by the access component 116). If at 718, the alternate authentication feature is not successfully completed, the process can proceed to 722, at which the feature block is maintained, or at which access to the feature can be locked (e.g., by the access component 116).

Figure 8:
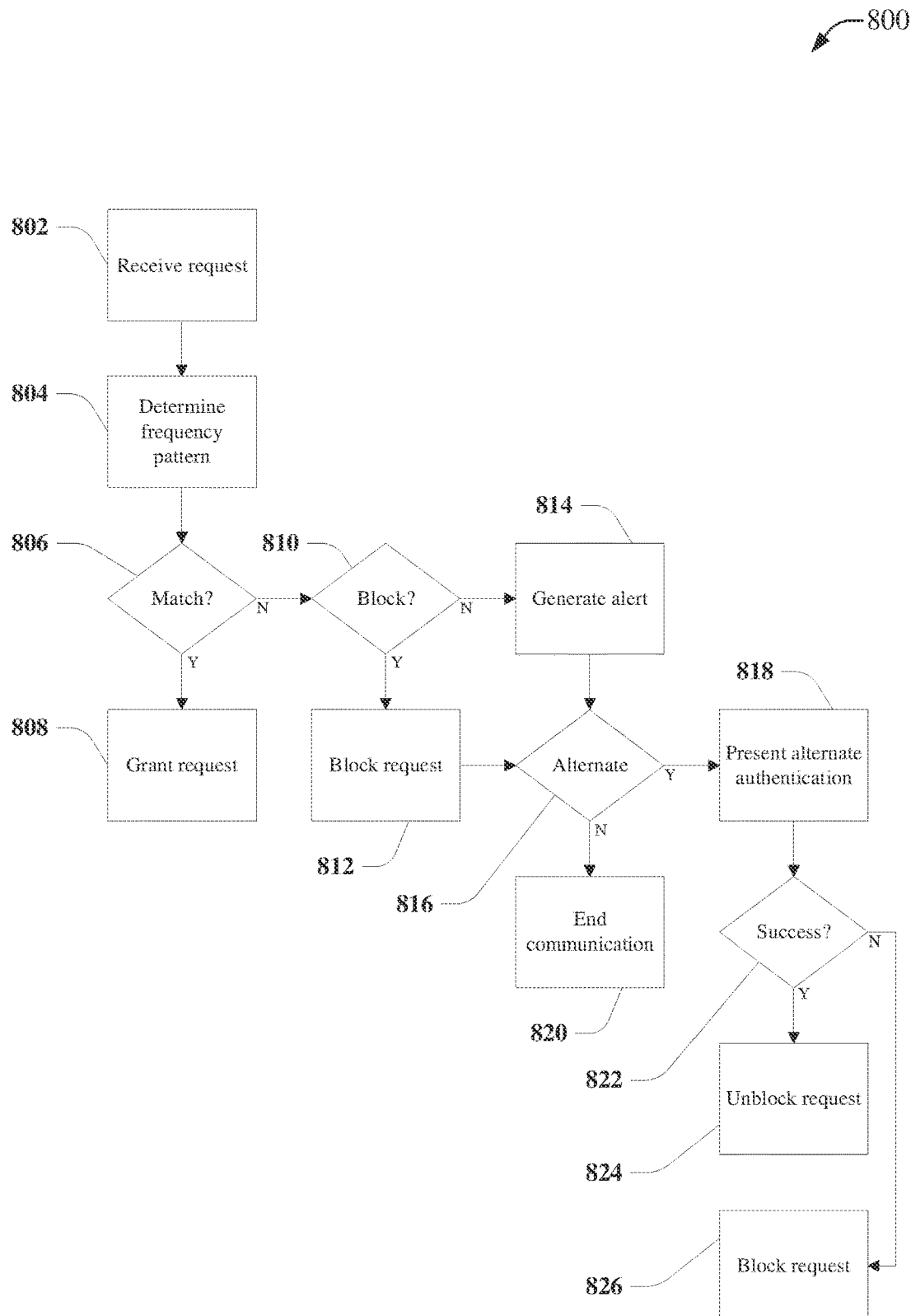
FIG. 8 is a flowchart for a process associated with user authentication in accordance with one or more embodiments described herein.

Turning now to FIG. 8, there is illustrated a flowchart of a process 800 relating to user authentication in accordance with one or more embodiments described herein. At 802 a request to initiate an audio communication with a second device (e.g., a device 508) can be received (e.g., via a communication component 306) by a first device (e.g., a device comprising a system 502). In this regard, the request to initiate the audio communication can comprise an audio authentication signal. At 804, the first device can determine (e.g., using a pattern component 504) whether a frequency pattern of the audio authentication signal threshold matches a defined audio frequency pattern. At 806, if the frequency pattern of the audio authentication signal threshold matches the defined audio frequency pattern, the request to initiate the audio communication with the second device can be granted at 808 (e.g., using a communication component 306). If at 806, the frequency pattern of the audio authentication signal does not threshold match the defined audio frequency pattern, the process can proceed to 810. At 810, if an immediate blocking feature is enabled, the frequency pattern of the audio authentication signal not threshold matching the defined audio frequency pattern can result in a blocking of the request to initiate the audio communication with the second device at 812. If at 810, the immediate blocking feature is not enabled, the process can proceed to 814 at which alert information representative of a warning that the request to initiate the audio communication is unauthorized can be generated and/or transmitted (e.g., from the first device to the second device) (e.g., using an alert component 506 and/or communication component 306). At 816, if an alternate authentication feature is enabled, process can proceed to 818, else the communication can be terminated at 820 (e.g., using the communication component 306). At 818, the alternate authentication feature can be presented (e.g., by the first device to the second device) (e.g., using the communication component 306 and/or a GUI of the second mobile device). At 822, if the alternate authentication feature is successfully completed, the request to initiate the audio communication with the second device can be unblocked at 824 (e.g., using the communication component 306). If at 822, the alternate authentication feature is not successfully completed, the request to initiate the audio communication with the second device can be blocked at 826 (e.g., using the communication component 306).

Figure 9:
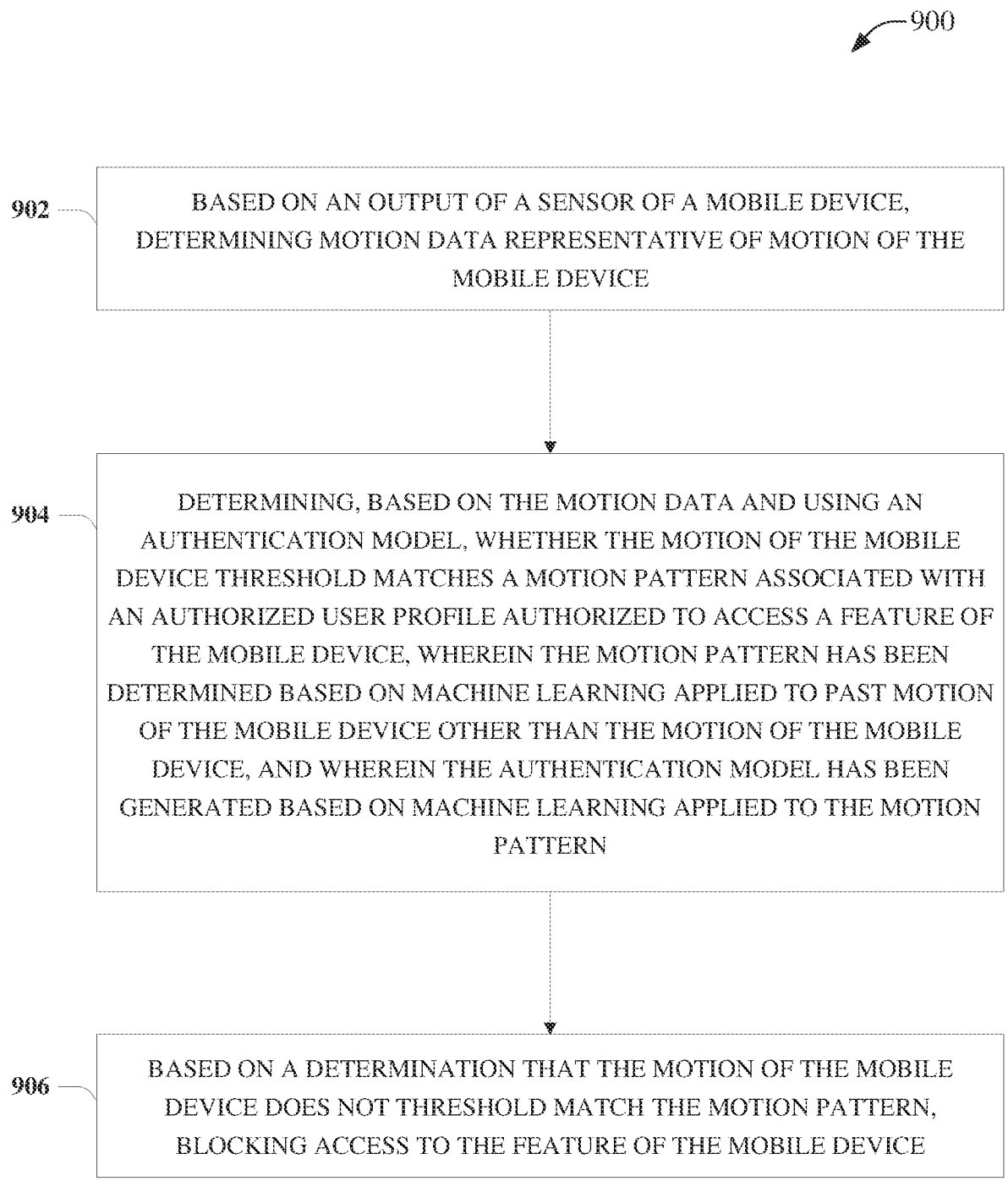
FIG. 9 is a block flow diagram for a process associated with machine-learning based user authentication in accordance with one or more embodiments described herein.

FIG. 9 illustrates a block flow diagram for a process 900 associated with machine-learning based user authentication in accordance with one or more embodiments described herein. At 902, the process 900 can comprise, based on an output of a sensor (e.g., sensor 110) of a mobile device, determining (e.g., using an activity component 112) motion data representative of motion of the mobile device. At 904, the process 900 can comprise determining (e.g., using the activity component 112 and/or M.L. component 114), based on the motion data and using an authentication model (e.g., using an M.L. component 114), whether the motion of the mobile device threshold matches a motion pattern associated with an authorized user profile authorized to access a feature of the mobile device, wherein the motion pattern has been determined (e.g., using the M.L. component 114) based on machine learning applied to past motion of the mobile device other than the motion of the mobile device, and wherein the authentication model has been generated (e.g., using the M.L. component 114) based on machine learning applied to the motion pattern. At 906, the process 900 can comprise, based on a determination (e.g., by the access component 116) that the motion of the mobile device does not threshold match the motion pattern, blocking (e.g., using the access component 116) access to the feature of the mobile device.

Figure 10:
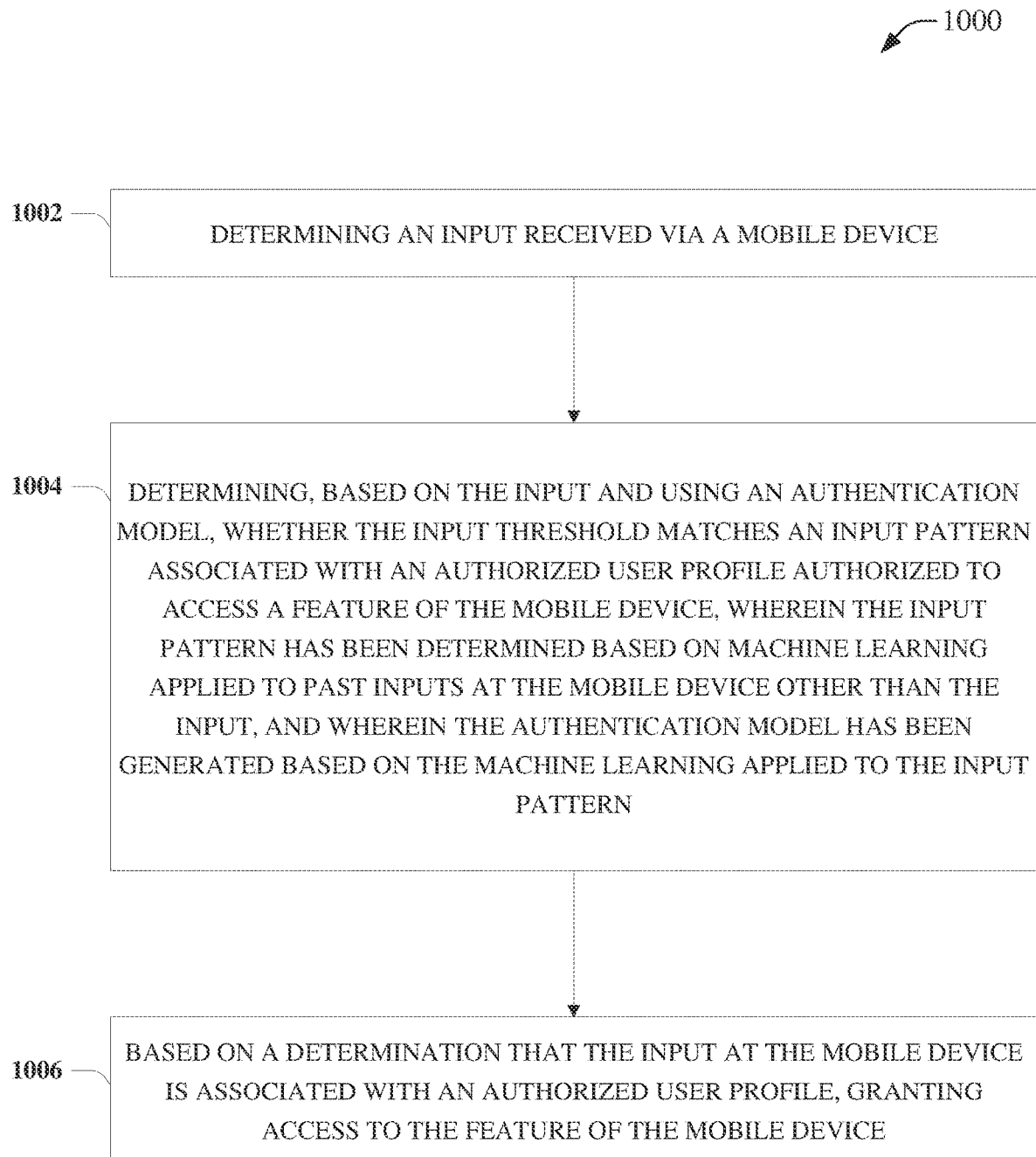
FIG. 10 is a block flow diagram for a process associated with machine-learning based user authentication in accordance with one or more embodiments described herein.

FIG. 10 illustrates a block flow diagram for a process 1000 associated with machine-learning based user authentication in accordance with one or more embodiments described herein. At 1002, the process 1000 can comprise determining (using an activity component 112) an input received via a mobile device (e.g., via a sensor 110 and/or activity component 112). At 1004, the process 1000 can comprise determining, based on the input and using an authentication model (e.g., using the activity component 112 and/or M.L. component 114), whether the input threshold matches an input pattern associated with an authorized user profile authorized to access a feature of the mobile device, wherein the input pattern has been determined (e.g., using the M.L. component 114) based on machine learning applied to past inputs at the mobile device other than the input, and wherein the authentication model has been generated (e.g., using the M.L. component 114) based on the machine learning applied to the input pattern. At 1006, the process 1000 can comprise, based on a determination (e.g., using the activity component 112 and/or M.L. component 114) that the input at the mobile device is associated with an authorized user profile, granting (e.g., using the access component 116) access to the feature of the mobile device.

Figure 11:
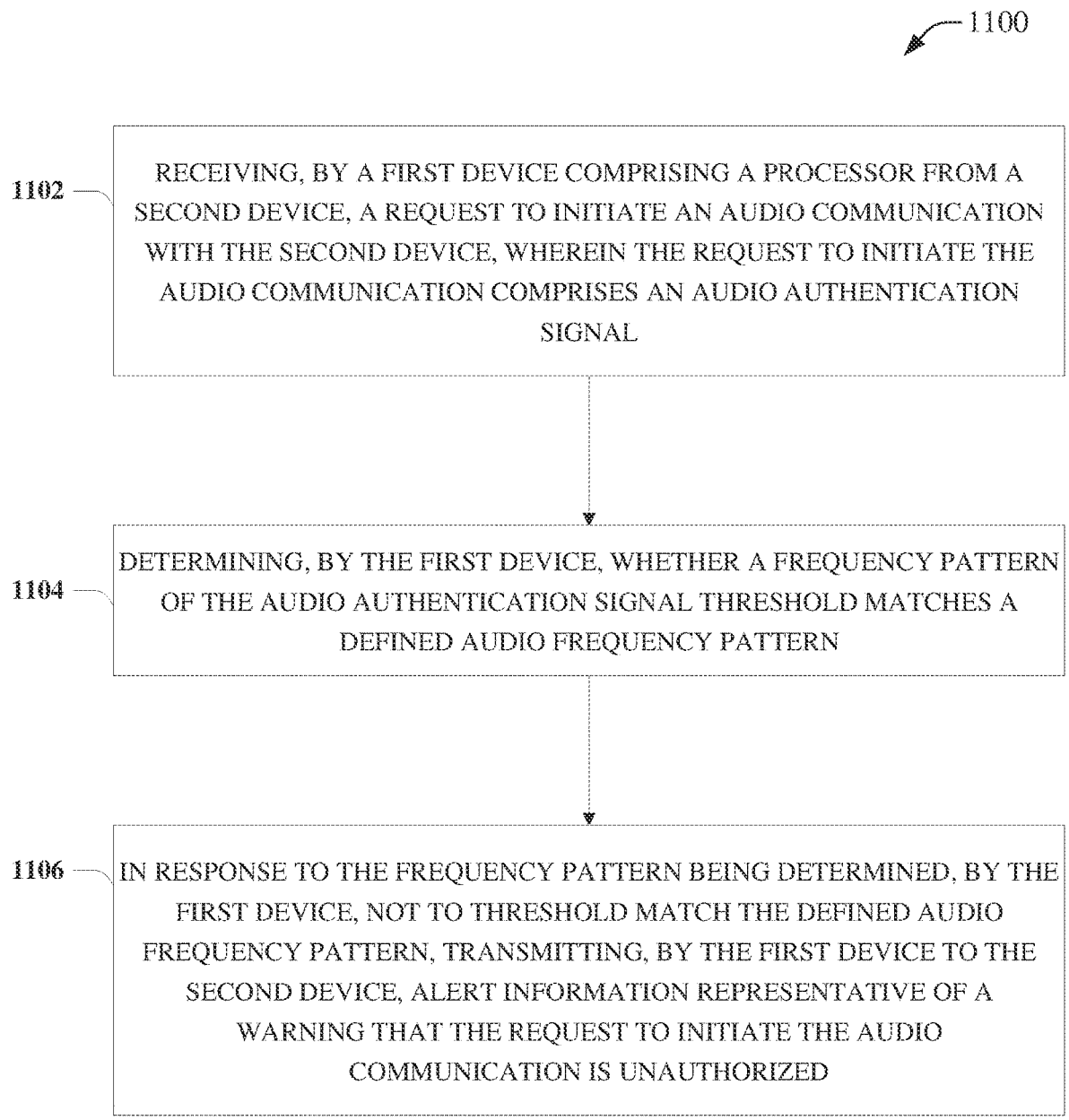
FIG. 11 is a block flow diagram for a process associated with user authentication in accordance with one or more embodiments described herein.

FIG. 11 illustrates a block flow diagram for a process 1100 associated with user authentication in accordance with one or more embodiments described herein. At 1102, the process 1100 can comprise receiving, by a first device comprising a processor from a second device (e.g., via a communication component 306), a request to initiate an audio communication with the second device (e.g., a device 508), wherein the request to initiate the audio communication comprises an audio authentication signal. At 1104, the process 1100 can comprise determining, by the first device (e.g., using a pattern component 504), whether a frequency pattern of the audio authentication signal threshold matches a defined audio frequency pattern. At 1106, the process 1100 can comprise, in response to the frequency pattern being determined, by the first device (e.g., using the pattern component 504), not to threshold match the defined audio frequency pattern, transmitting, by the first device (e.g., via the communication component 306) to the second device, alert information (e.g., generated by the alert component 506) representative of a warning that the request to initiate the audio communication is unauthorized.

Figure 12:
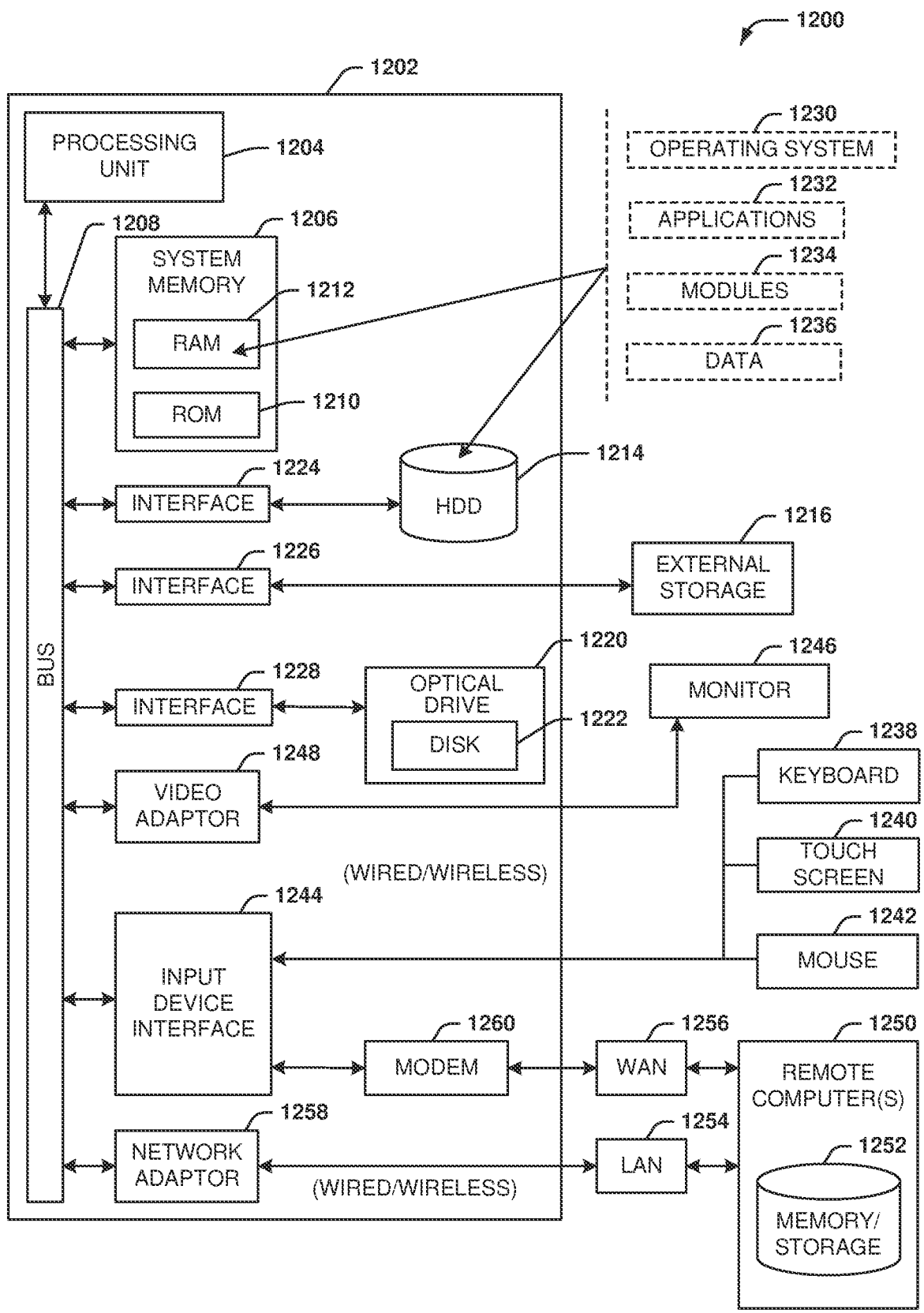
FIG. 12 is an example, non-limiting computing environment in which one or more embodiments described herein can be implemented.

In order to provide additional context for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared, and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid-state drive (SSD) could be used in addition to, or in place of, an HDD 1214. The HDD 1214, external storage device(s) 1216 and optical disk drive 1220 including a disk 1222 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enable with a security module, such as a trusted processing module (TPM). For instance, with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 13:
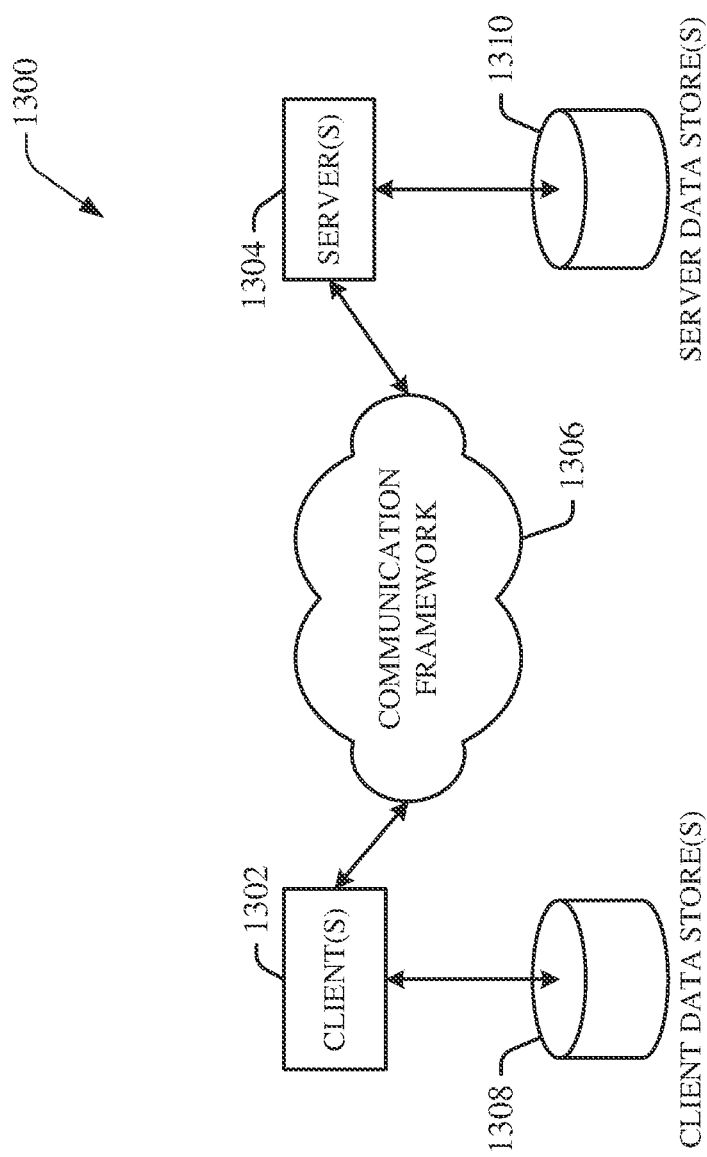
FIG. 13 is an example, non-limiting networking environment in which one or more embodiments described herein can be implemented.

Referring now to FIG. 13, there is illustrated a schematic block diagram of a computing environment 1300 in accordance with this specification. The system 1300 includes one or more client(s) 1302, (e.g., computers, smart phones, tablets, cameras, PDA's). The client(s) 1302 can be hardware and/or software (e.g., threads, processes, computing devices). The client(s) 1302 can house cookie(s) and/or associated contextual information by employing the specification, for example.

The system 1300 also includes one or more server(s) 1304. The server(s) 1304 can also be hardware or hardware in combination with software (e.g., threads, processes, computing devices). The servers 1304 can house threads to perform transformations of media items by employing aspects of this disclosure, for example. One possible communication between a client 1302 and a server 1304 can be in the form of a data packet adapted to be transmitted between two or more computer processes wherein data packets may include coded analyzed headspaces and/or input. The data packet can include a cookie and/or associated contextual information, for example. The system 1300 includes a communication framework 1306 (e.g., a global communication network such as the Internet) that can be employed to facilitate communications between the client(s) 1302 and the server(s) 1304.

Communications can be facilitated via a wired (including optical fiber) and/or wireless technology. The client(s) 1302 are operatively connected to one or more client data store(s) 1308 that can be employed to store information local to the client(s) 1302 (e.g., cookie(s) and/or associated contextual information). Similarly, the server(s) 1304 are operatively connected to one or more server data store(s) 1310 that can be employed to store information local to the servers 1304.

In one exemplary implementation, a client 1302 can transfer an encoded file, (e.g., encoded media item), to server 1304. Server 1304 can store the file, decode the file, or transmit the file to another client 1302. It is noted that a client 1302 can also transfer uncompressed file to a server 1304 and server 1304 can compress the file and/or transform the file in accordance with this disclosure. Likewise, server 1304 can encode information and transmit the information via communication framework 1306 to one or more clients 1302.

The illustrated aspects of the disclosure may also be practiced in distributed computing environments where certain tasks are performed by remote processing devices that are linked through a communications network. In a distributed computing environment, program modules can be located in both local and remote memory storage devices.

The above description includes non-limiting examples of the various embodiments. It is, of course, not possible to describe every conceivable combination of components or methods for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
a processor; and
a memory that stores executable instructions that, when executed by the processor, facilitate performance of operations, comprising:
based on an output of a sensor of a mobile device, determining motion data representative of motion of the mobile device, wherein the motion data are generated based on repeated user movements or activities for using the mobile device and repeated to exceed a predetermined threshold count during a preset time window to be recognized as a motion pattern associated with an authorized user profile, and wherein the motion data further comprise a location of the mobile device detected with the repeated user movements or activities, and a time of the repeated user movements or activities, and the motion pattern represents user habits of using the mobile device that becomes a user signature associated with a user of the authorized user profile, and wherein the user signature is not based on biometric information of the user;

determining, based on the motion data and using an authentication model, whether the motion of the mobile device threshold matches the motion pattern associated with the authorized user profile authorized to access a feature of the mobile device, wherein the motion pattern has been determined based on machine learning applied to past motion of the mobile device other than the motion of the mobile device, and wherein the authentication model has been generated based on machine learning applied to the motion pattern;

based on a determination that the motion of the mobile device does not threshold match the motion pattern, blocking access to the feature of the mobile device;

determining an input received at the mobile device, wherein the input received at the mobile device comprises an application accessed for a threshold amount of time during a defined time window, activities correlated to the application over time, reactions correlated to the application over time, or a combination thereof, and wherein the application runs on the mobile device;

determining, based on the input and using the authentication model, whether the input threshold matches an input pattern associated with the authorized user profile, wherein the input pattern has been determined based on the machine learning applied to past inputs at the mobile device other than the input, and wherein the authentication model has been further generated based on the machine learning applied to the input pattern; and based on a determination that the input does not threshold match the input pattern, blocking the access to the feature of the mobile device.

2. The system of claim 1, wherein the sensor comprises an accelerometer, and wherein the motion of the mobile device comprises a speed, angle, or motion range of the mobile device.

3. The system of claim 1, wherein the sensor comprises a pressure sensor, and wherein the motion of the mobile device comprises a degree of force of applied to a touch screen of the mobile device.

4. The system of claim 1, wherein the operations further comprise:

in response to blocking access to the feature of the mobile device,
generating a prompt for an alternate authentication feature associated with the authorized user profile, and
displaying the prompt via a graphical user interface of the mobile device, wherein the alternate authentication feature comprises a comparison of an input at the mobile device with a defined input known to be associated with the authorized user profile; and in response to the alternate authentication feature being determined to be completed via the mobile device, unblocking access to the feature of the mobile device.

5. The system of claim 4, wherein the defined input comprises a prerecorded video clip associated with the authorized user profile, wherein the alternate authentication feature comprises a comparison of the prerecorded video clip and a live stream captured by a camera of the mobile device, and wherein the operations further comprise:

in response to the live stream and the prerecorded video clip being determined to comprise a threshold similarity according to a similarity criterion, unblocking access to the feature of the mobile device.

6. The system of claim 4, wherein the defined input comprises a prerecorded audio clip associated with the authorized user profile, wherein the alternate authentication feature comprises a comparison of the prerecorded audio clip and a live stream captured by a microphone of the mobile device, and wherein the operations further comprise:

in response to the live stream and the prerecorded audio clip being determined to comprise a threshold similarity according to a similarity criterion, unblocking access to the feature of the mobile device.

7. The system of claim 1, wherein the feature comprises an application of the mobile device or a hardware component of the mobile device.

8. The system of claim 1, wherein the activities correlated to the application over time further comprise activities inside visited websites over time, pressure and length of touch associated with the application, a movement of the mobile device associated with the application, or a combination thereof.

9. The system of claim 8, wherein the input pattern comprises a habitual user input associated with the authorized user profile, and wherein the habitual user input comprises a sequence of inputs received via the mobile device.

10. The system of claim 8, wherein the input pattern comprises an application accessed for a threshold amount of time during a defined time window.

11. A non-transitory machine-readable medium, comprising executable instructions that, when executed by a processor, facilitate performance of operations, comprising:

based on an output of a sensor of a mobile device, determining motion data representative of motion of the mobile device, wherein the motion data are generated based on repeated user movements or activities for using the mobile device and repeated to exceed a predetermined threshold count during a preset time window to be recognized as a motion pattern associated with an authorized user profile, and wherein the motion data further comprise a location of the mobile device detected with the repeated user movements or activities, and a time of the repeated user movements or activities, and the motion pattern represents user habits of using the mobile device that becomes a user signature associated with a user of the authorized user profile, and wherein the user signature is not based on biometric information of the user;

determining, based on the motion data and using an authentication model, whether the motion of the mobile device threshold matches the motion pattern associated with the authorized user profile authorized to access a feature of the mobile device, wherein the motion pattern has been determined based on machine learning applied to past motion of the mobile device other than the motion of the mobile device, and wherein the authentication model has been generated based on machine learning applied to the motion pattern;

based on a determination that the motion of the mobile device does not threshold match the motion pattern, blocking access to the feature of the mobile device;

determining an input received via the mobile device, wherein the input received at the mobile device comprises an application accessed for a threshold amount of time during a defined time window, activities correlated to the application over time, reactions correlated to the application over time, or a combination thereof, and wherein the application runs on the mobile device;

determining, based on the input and using the authentication model, whether the input threshold matches an input pattern associated with the authorized user profile authorized to access a feature of the mobile device, wherein the input pattern has been determined based on machine learning applied to past inputs at the mobile device other than the input, and wherein the authentication model has been generated based on the machine learning applied to the input pattern; and based on a determination that the input at the mobile device is associated with the authorized user profile, granting access to the feature of the mobile device.

12. The non-transitory machine-readable medium of claim 11, wherein the past inputs at the mobile device are determined using a tracking cookie installed on the mobile device.

13. The non-transitory machine-readable medium of claim 11, wherein the feature comprises an unlock function, executable by the mobile device and configured to unlock a door of a vehicle communicatively coupled to the mobile device.

14. The non-transitory machine-readable medium of claim 11, wherein the feature comprises a package release request function, executable by the mobile device and configured to generate a package release request signal and to send the package release request signal to a device associated with a delivery entity, and wherein the package release request function is registered with the delivery entity.

15. The non-transitory machine-readable medium of claim 11, wherein the feature comprises graphic representation, rendered via a graphical user interface of the mobile device, of vaccine data representative of a vaccine associated with the authorized user profile.

16. The non-transitory machine-readable medium of claim 11, wherein the feature comprises graphic representation, rendered via a graphical user interface of the mobile device, of an identification card associated with the authorized user profile.

17. A method, comprising:
determining, by a processing system including a processor, a motion data representative of motion of a mobile device based on an output of a sensor of the mobile device, wherein the motion data are generated based on repeated user movements or activities for using the mobile device and repeated to exceed a predetermined threshold count during a preset time window to be recognized as a motion pattern associated with an authorized user profile, and wherein the motion data further comprise a location of the mobile device detected with the repeated user movements or activities, and a time of the repeated user movements or activities, and the motion pattern represents user habits of using the mobile device that becomes a user signature associated with a user of the authorized user profile, and wherein the user signature is not based on biometric information of the user;

determining, based on the motion data and using an authentication model, whether the motion of the mobile device threshold matches the motion pattern associated with the authorized user profile authorized to access a feature of the mobile device, wherein the motion pattern has been determined based on machine learning applied to past motion of the mobile device other than the motion of the mobile device, and wherein the authentication model has been generated based on machine learning applied to the motion pattern;

based on a determination that the motion of the mobile device threshold matches the motion pattern, granting access to the feature of the mobile device;

determining an input received at the mobile device, wherein the input received at the mobile device comprises an application accessed for a threshold amount of time during a defined time window, activities correlated to the application over time, reactions correlated to the application over time, or a combination thereof, and wherein the application runs on the mobile device;

determining, based on the input and using the authentication model, whether the input threshold matches an input pattern associated with the authorized user profile, wherein the input pattern has been determined based on the machine learning applied to past inputs at the mobile device other than the input, and wherein the authentication model has been further generated based on the machine learning applied to the input pattern; and based on a determination that the input does not threshold match the input pattern, blocking the access to the feature of the mobile device.

18. The method of claim 17, further comprising:
based on a determination that the motion of the mobile device does not threshold match the motion pattern, denying access to the feature of the mobile device;

in response to blocking access to the feature of the mobile device,
generating, by the processing system, a prompt for an alternate authentication feature associated with the authorized user profile, and
displaying, by the processing system, the prompt via a graphical user interface of the mobile device, wherein the alternate authentication feature comprises a comparison of an input at the mobile device with a defined input known to be associated with the authorized user profile; and
in response to the alternate authentication feature being determined to be completed via the mobile device, unblocking, by the processing system, access to the feature of the mobile device.

19. The method of claim 17, wherein the reactions correlated to the application over time further comprises a movement of the mobile device associated with the application, a follow-up input on the mobile device associated with the application or a combination thereof.

20. The method of claim 17, further comprising:
determining, by the processing system, the past motion at the mobile device using a tracking cookie installed on the mobile device.

* * * * *